United States Patent

[11] 3,625,293

[72] Inventor Richard Dale Nelson
Cambridge, Ill.
[21] Appl. No. 7,443
[22] Filed Feb. 2, 1970
[45] Patented Dec. 7, 1971
[73] Assignee Deere & Company
Moline, Ill.

[54] GAUGE WHEEL FOR A TWO-WAY PLOW
10 Claims, 3 Drawing Figs.

[52] U.S. Cl. .................................................... 172/212,
172/395
[51] Int. Cl. ...................................................... A01b 3/28,
A01b 3/40
[50] Field of Search ........................................... 172/161,
212, 224, 204

[56] References Cited
UNITED STATES PATENTS
2,845,014  7/1958  Pursche ....................... 172/212

| | | | |
|---|---|---|---|
| 2,923,362 | 2/1960 | Toland et al. .................. | 172/212 |
| 3,128,832 | 4/1964 | Habare .......................... | 172/212 |
| 3,174,556 | 3/1965 | Knapp et al. .................. | 172/212 |
| 3,305,024 | 2/1967 | Ogle, Jr. ........................ | 172/212 |

*Primary Examiner*—Robert E. Pulfrey
*Assistant Examiner*—C. W. Hanor
*Attorneys*—H. Vincent Harsha, Harold M. Knoth, William A. Murray, John M. Nolan and Raymond L. Hollister ABSTRACT: A two-way plow having alternately usable right- and left-hand plow units mounted on a frame that is selectively rotatable about a fore-and-aft axis to dispose the plow units in operating positions and a single gauge wheel that is automatically positioned when the plow is indexed to one of its alternate plowing positions to regulate the plowing depth when the plow is in either of its plowing positions. The mounting of the gauge wheel includes a single adjustment which varies the working depth of the plow for both of the plowing positions, and the adjustment can easily be made by hand without the use of tools when the plow is intermediate its alternate positions.

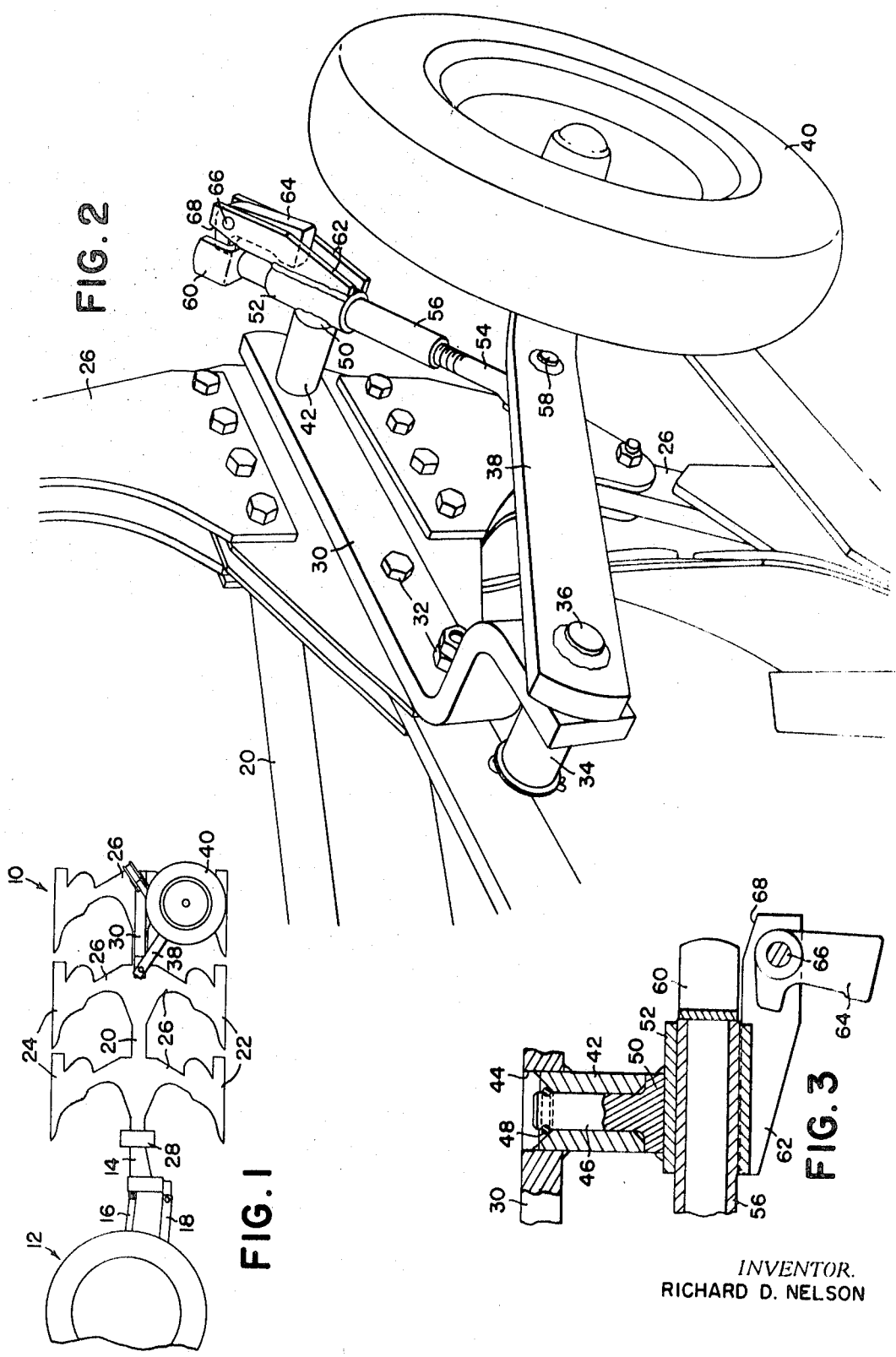

GAUGE WHEEL FOR A TWO-WAY PLOW

BACKGROUND OF THE INVENTION

The present invention relates generally to two-way plows, and more particularly relates to gauge wheels for two-way plows.

A conventional two-way plow has alternately usable right- and left-hand plow units for directing a furrow slice in either lateral direction. The plow units are conventionally disposed on opposite sides of the plow frame and are alternately positioned for operation by rotating the frame about a generally longitudinally extending axis. Such plows also include a gauge means which supports the frame a predetermined distance above the ground to regulate the operating depth of the plow in either of its alternate working positions. In the past, the gauge means has taken one of two forms: a pair of gauge wheels mounted on the plow frame with each wheel being properly positioned for operation in one of the alternate working positions of the plow; or, a single gauge wheel which is supported on a swingable arm carried by the plow frame.

This invention is specifically concerned with providing a novel latching mechanism for those gauge wheels which are supported on an arm swingably carried by the plow frame for movement between alternate working positions.

SUMMARY OF THE INVENTION

An object of the present invention is to provide a latching mechanism for a single gauge wheel which regulates the working depth of a two-way plow in either of its working positions, which latching mechanism includes a single gravity operated latch which automatically locks the gauge wheel in its alternate working positions.

Another object of the invention is to provide a gauge wheel assembly for two-way plows which utilize a single latch for locking the gauge wheel in its alternate working positions, and which requires only a single adjustment to simultaneously set the working depth of the plow in both of its operative positions.

Still another object of the present invention is to provide a gauge wheel assembly for two-way plows which requires only a single adjustment to set the working depth of the plow in both of its operative positions, and which adjustment can be made without the use of tools.

The above and additional objects and advantages will become apparent along with the details of construction of a preferred embodiment of the invention from a reading of the following detailed description when taken in conjunction with the accompanying drawing.

BRIEF DESCRIPTION OF THE DRAWING

In the drawing:

FIG. 1 is a side elevational view of a typical two-way plow including a single gauge wheel;

FIG. 2 is a perspective view of a portion of a two-way plow having a gauge wheel according to the present invention mounted thereon; and, FIG. 3 is a sectional view of the latching mechanism for the gauge wheel illustrated in FIG. 2.

DESCRIPTION OF THE PREFERRED EMBODIMENT

In the drawings there is shown a two-way plow 10 attached to a tractor 12. The plow 10 includes a main support frame 14 integrally connected to the upper and lower draft links 16 and 18 of the tractor 12. The plow 10 further includes a rollover frame 20 which is mounted on the main frame 14 for rotation about its longitudinal axis. A plurality of right-hand left-hand plow bottoms 22 and 24 are mounted on the rollover frame 20 by standards 26. The rollover frame 20 can be moved between its alternate right- and left-hand working positions in any conventional manner such as by a hydraulic motor schematically illustrated at 28. The two-way plow thus far described is of conventional structure and is illustrated solely for the purpose of providing a better understanding of the invention.

The tail wheel assembly according to the present invention includes an elongated support bar 30 which is secured to the rollover frame 20 by bolts 32. The support bar 30 is mounted on the rollover frame 20 so that it extends parallel to the axis of rotation of the rollover frame 20 and is positioned in the same horizontal plane as the axis of rotation of the rollover frame 20 whenever the plow is in either of its alternate working positions. The forward end of the support bar 30 is laterally offset, is provided with an aperture, and has a sleeve 34 secured thereto in registry with the aperture. The sleeve 34 and aperture provide a journal for a pivot pin 36 which is secured to and extends to one side of the forward end of an axle arm 38. A gauge wheel 40 is journaled on the opposite end of the axle arm 38.

The gauge wheel 40 is automatically positioned and locked in its alternate working positions by a latching mechanism which includes a pivoted guide assembly, a telescopic link assembly and a latch assembly. The pivoted guide assembly includes a sleeve or bushing 42 which is secured in an aperture 44 provided in the support bar 30 near its rearmost end. The sleeve 42 is retained in the aperture 44 in any conventional manner such as welding. A pivot pin 46 extends through the sleeve 42 and is retained therein by a snap ring 48 at its inner end and an enlarged head portion 50 at its outer end. A tubular guide member 52 is secured to the head 50 of the pivot pin 46 in any conventional manner such as welding.

The telescoping link assembly includes an eye bolt 54 and an internally threaded elongated tubular member 56. The eye bolt 54 is pivotally secured to the axle arm 38 by a pivot pin 58. The tubular member 56 is slidably mounted within the guide 52 and is threaded onto the end of the eye bolt 54. A stop member 60 on the end of the tubular member 56 prevents removal of the telescoping link assembly from the guide member 52 without unthreading the connection between the tubular member 56 and eye bolt 54. The stop member 60 is generally of U-shape and its bight portion is of a size sufficient to extend beyond opposite edges of the tubular member 56 for a reason which will become apparent from the description of operation.

The latch assembly includes a pair of brackets or plates 62 which are welded to the tubular guide member 52, are positioned in parallelism, and extend beyond the end of the tubular guide member. A latch 64 is pivotally mounted between the plates 62 near their outer ends by a pivot pin 66. The latch 64 is generally of L-shape and when in the operative position, its long leg extends generally parallel to the telescopic link assembly and its short leg extends over the stop member 60 as illustrated in FIG. 2 to limit movement of the link assembly through the guide member 52 in one direction.

The uppermost ends of the plates 62 are tapered outwardly to provide cam surfaces 68 which cooperate with the stop member 60 to prevent accidental rotation of the tubular member 56.

In FIG. 2, the plow is illustrated in its right-hand working position, and it can be seen that as the plow is lowered and the gauge wheel 40 engages the earth, the telescopic link assembly will be forced upward through the guide member 52. However, the movement of the telescopic link assembly is limited by engagement between the stop member 60 and the short leg of the latch member 64. When the stop member 60 engages the short leg of the latch member 64, the long leg thereof bears against the guide member 52 and retains the latch member 64 in its operative position. The telescopic link assembly and latch 64 thus determine and retain the gauge wheel 40 in its right-hand working position.

When the plow 10 is raised prior to indexing or prior to rotating the rollover frame to its left-hand plowing position, the weight of the gauge wheel 40 pulls the telescopic link assembly downward so that the stop member 60 engages the guide member 52. When the stop member 60 has moved into engagement with the guide member 52, the latch 64 is free to rotate in a counterclockwise direction as viewed in FIG. 3. When the rollover frame 20 is rotated to its left-hand working position, the gauge wheel assembly moves under the main frame 20 so that the force of gravity acting on the latch member 64 pivots the same to the position illustrated in FIG. 3. As the rollover frame moves past the midpoint of its turning movement, the gauge wheel 40 moves above the pivot axis of the axle arm 38 so that the force of gravity will tend to move the gauge wheel 40 to its left-hand working position. As the gauge wheel 40 begins to move to its left-hand working position, the telescopic link assembly is first pushed back through the guide member 52 until the gauge wheel 40 reaches the midpoint of its movement. Additional movement of the gauge wheel 40 then pulls the telescopic link assembly forward through the guide member 52 until the stop 60 again engages the guide member 52. As the rollover frame 20 approaches its left-hand working position, the force of gravity will again act on the latch member 64 to return the same to its operative latched position so that when the plow is again lowered, the short leg of the latch 64 will limit the movement of the telescopic link assembly.

The threaded connection between the eye bolt 54 and tubular member 56 provides a simple, but infinitely variable adjustment for changing the gauging depth without the use of tools. Thus, when the plow is half-way indexed so that any movement of the axle arm 38 occurs in a horizontal plane, an adjustment is simply made by moving the gauge wheel 40 midway between its alternate positions so that the telescopic link assembly is forced back through the tubular guide member 52 and the stop member 60 is behind the plates 62. It is then possible to rotate the tubular member 56 on the eye bolt 54 to vary the length of the telescopic link assembly.

The cam surfaces 68 on plates 62 cooperate with the stop member 60 to prevent any accidental rotation of the tubular member 56 since each time the plow is indexed and the stop member 60 moves down into engagement with the guide member 52, the longitudinal axis of the bight portion of stop member 60 must be extending transversely to the planes of the plates 62. If the stop member 60 is not so aligned one of its ends will contact one of the cam surfaces 68 so that movement of the stop member towards the guide member 52 will rotate the stop member 60 to the proper position. Thus, should the tubular member 56 be accidentally rotated through a small distance during indexing of the plow, the stop member 60 and cam surfaces 68 cooperate to return the tubular 56 to its original position when the rollover frame 20 approaches one of its working positions. When the plow is in one of its working positions, the plates 62 prevent any rotation of the tubular member 56.

From the foregoing description of construction and operation, it can be seen that the present invention provides a single gauge wheel for two-way plows which utilizes a single latching mechanism to position and lock the gauge wheel in its alternate working positions and which latching mechanism includes a simple single adjustment for changing the working depth of a plow.

Although only a single preferred embodiment of the invention has been described and illustrated, various modifications within the spirit and scope of the invention will become apparent to those skilled in the art and can be made without departing from the underlying principles of the invention.

I claim:

1. In combination with a two-way plow having right- and left-hand plow units mounted on a frame rotatable about a longitudinal axis between alternate plowing positions to alternately disposed the right- and left-hand plow units in operating positions, a single gauge means for supporting the frame a predetermined distance above the ground in either alternate plowing position of the frame comprising: an axle arm pivotally mounted on the frame for rocking movement about an axis generally transverse to the axis of rotation of the frame; a gauge wheel journaled on the axle arm; a tubular guide member pivotally mounted on the frame for rocking movement about an axis perpendicular to its longitudinal axis and generally parallel to the axle arm axis; an elongated link member slidably mounted in the guide member and having one end pivotally connected to the axle arm; a stop member on the opposite end of the link member preventing removal of the link member from the guide member; and a gravity-actuated latch member pivotally mounted on the guide member for movement between an operative position in which a portion thereof extends over the stop member and prevents movement of the link member in one direction when the frame is in either of its alternate plowing positions and an inoperative position when the frame is intermediate its alternate plowing position.

2. The combination set forth in claim 1 further including means to vary the length of the link member.

3. The combination set forth in claim 1 wherein the link member includes a threaded eye bolt pivotally connected to the axle arm, an internally threaded tube slidably mounted in the guide member, and the tube is threadedly connected to the eye bolt whereby, by rotating the tube the length of the link member can be varied.

4. The combination set forth in claim 3 wherein bracket means is secured to the guide member, the latch is pivotally mounted on the bracket means, and the bracket means includes cam means which cooperate with the stop member to reposition the tube if the tube is accidentally rotated during movement of the frame between its alternate plowing position.

5. The combination set forth in claim 4 wherein the bracket means includes a pair of parallel plates extending beyond one end of the guide member, the extending ends of the plates are tapered to provide a pair of cam surfaces on opposite sides of the centerline of the tube, and the stop member extends beyond opposite sides of the tube.

6. For use with a two-way plow having right- and left-hand plow units mounted on the rollover frame which is rotatable between alternate working positions to alternately dispose the right- and left-hand plow units in operating positions, a gauge means for supporting the frame a predetermined distance above ground in either alternate working positions of the frame comprising: an elongated support bar securable to the frame parallel to the axis of rotation of the frame; an axle arm having its forward end pivotally connected to the forward end of the support bar; a gauge wheel journaled to the rear end of the axle arm; guide means mounted on a rear portion of the support bar for rocking movement about an axis parallel to the pivot axis of the axle arm; elongated rigid link means having its forward end pivotally connected to the axle arm and its rear portion slidably carried by the guide means for reciprocal movement with respect thereto; stop means on the rear end of the link means engageable with the guide means to limit forward movement of the link means and gravity actuated latch means pivotally mounted on the guide means for movement between an operative position in which it limits rearward movement of the link means when the frame is in either of its working positions and an inoperative position when the frame is intermediate its alternate working positions.

7. The combination set forth in claim 6 wherein the rigid link means includes a pair of telescopic members and means to hold the telescopic members in any adjusted relative position whereby the length of the link means can be adjusted and the working depth of the plow in either of its working positions can be varied.

8. The combination set forth in claim 7 wherein the means to hold the telescopic member in any adjusted relative position includes a threaded connection.

9. The combination set forth in claim 8 wherein cam means are mounted on the guide means and cooperate with the stop means to prevent accidental relative movement between the pair of telescopic members.

10. The combination set forth in claim 6 wherein the gravity-actuated latch means is generally of L-shape and is pivotally attached to the guide means at the joinder of its legs so that when in its operative position the short leg extends across the path of movement of the link means to prevent rearward movement of the link means and the long leg abuts against the guide means to prevent movement of the short leg as a result of pressure from the link means.